April 21, 1970  C. A. ALLDRED, JR., ET AL  3,507,387
PROCESS FOR SEPARATING MEAT FROM BONES
Original Filed Oct. 31, 1967  4 Sheets-Sheet 3
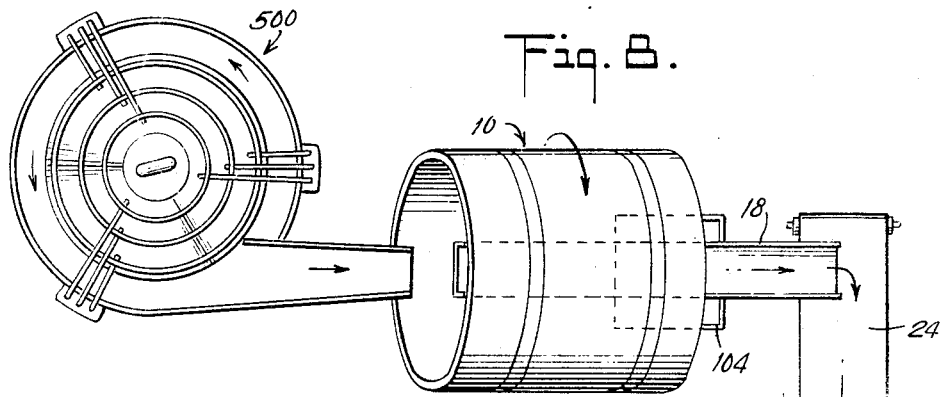
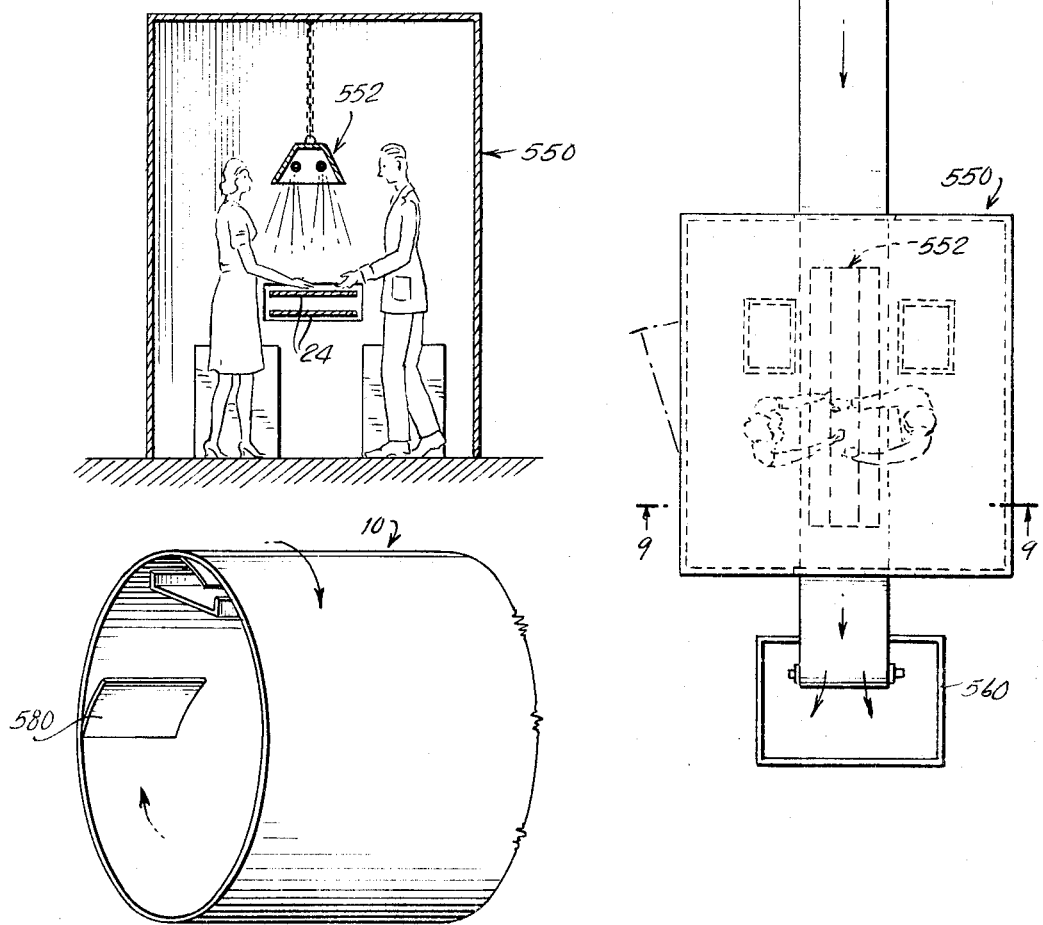

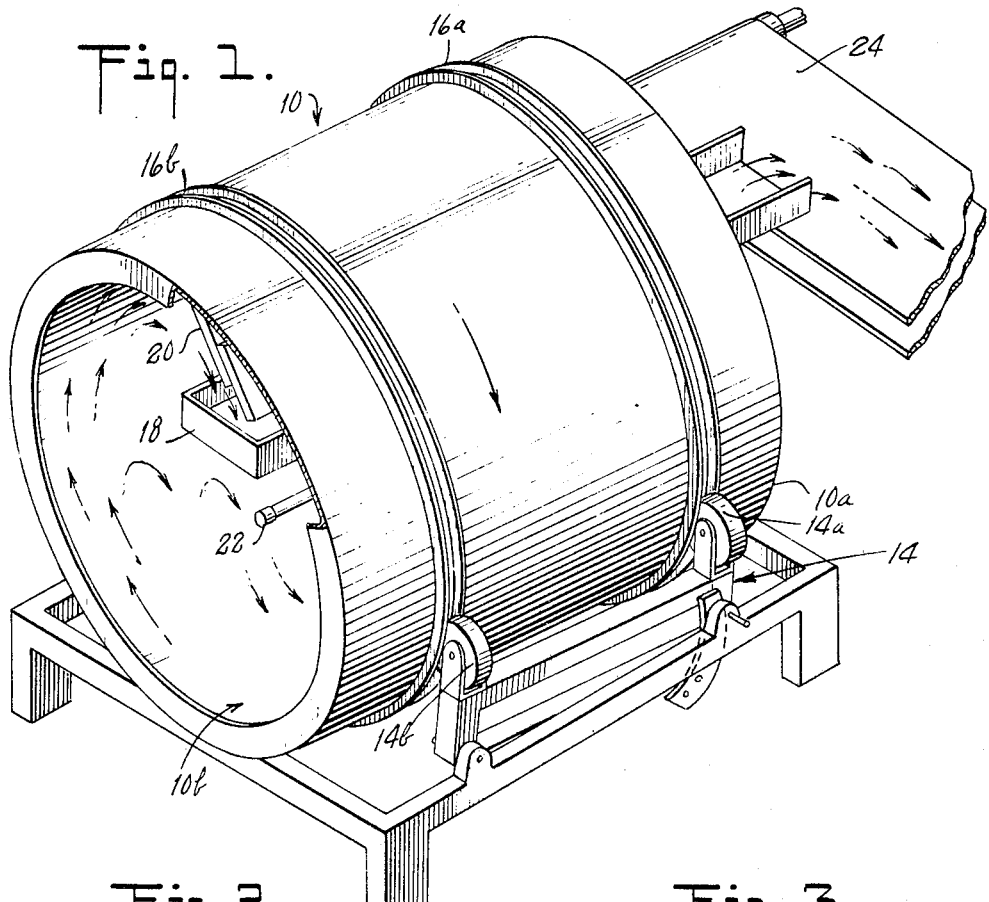
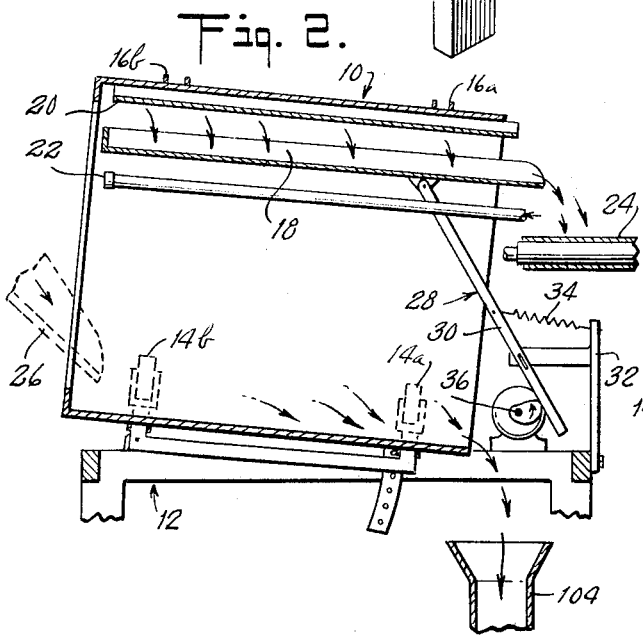
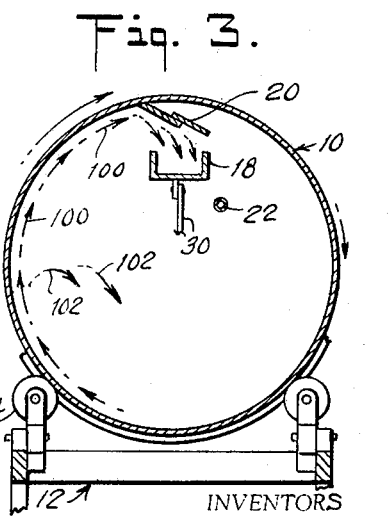

United States Patent Office 3,507,387
Patented Apr. 21, 1970

3,507,387
PROCESS FOR SEPARATING MEAT FROM BONES
Cyrus A. Alldred, Jr., and Lucas J. Conrad, Winston-Salem, N.C., assignors to R. J. Reynolds Tobacco Company, Winston-Salem, N.C., a corporation of New Jersey
Continuation of application Ser. No. 679,498, Oct. 31, 1967. This application May 8, 1969, Ser. No. 824,381
Int. Cl. B07b 13/00
U.S. Cl. 209—2                                 7 Claims

ABSTRACT OF THE DISCLOSURE

A method and apparatus are disclosed for effectively sorting or separating meat from conglomerate masses of already disunited meat and bone. The present invention exploits the variations in the characteristics of differing substances; more specifically, the different adhesive characteristics of meat and bone so that these two may be efficiently separated. The force of what is termed "adhesive-friction" is deployed in connection with certain other forces, namely centrifugal force, gravity and certain combinations thereof, to the end that the stickiness or adhesive properties of the meat will enable the separation of the meat from bony substances in an efficient and extremely simple manner. The present disclosure describes two basic configurations employing the above-noted principle. These are a drum and an impact configuration or embodiment.

---

This is a continuation of application Ser. No. 679,498 filed Oct. 31, 1967, now abandoned.

BACKGROUND, OBJECTS, AND SUMMARY OF THE INVENTION

It has been recognized as a highly desirable goal in the preparation of certain meat products that the meat be efficiently but gently disunited from the bones to which it normally adheres. The need for gentle separation of meat from bone is especially acute in the preparation of a poultry meat product such as chicken, which is to be canned or frozen, or otherwise treated. If gentle techniques are not employed but in contrast, bony pieces, such as the wings, back and necks, are subjected to an impact device, such as a hammer mill, there is a tendency to crush the meat and also, to shatter the bones with the result that tiny bone fragments may be present in the final food product.

The incentive to recover the meat from the aforenoted bony pieces of chicken derives from the economies that can be effected by increasing the yield from the meat processing operations. Normally such bony pieces would be discarded as economically infeasible to bother with. However, if automatic separating techniques can be applied the prohibitive labor costs associated with the manual removal of the meat would be eliminated.

One of the basic difficulties in the handling of chicken meat is that because of the small sized bones it is not a simple matter to remove the meat and immediately separate the meat from the small bones. In other words, in the processing of chicken meat and the like it is inevitable that, in the attainment of the disuniting of the meat and bones, there will result an output consisting of a conglomerate mass of meat and bones, and further steps must be performed to separate these components.

An effective technique and apparatus for gently disuniting the meat from such bony pieces as chicken wings and the like has already been described in copending application Ser. No. 603,484, filed Dec. 21, 1966, and assigned to the assignee of the present application. The present invention is related to the invention disclosed in the copending application by reason of the fact that the product resulting from the disuniting apparatus described in the copending application consists of a conglomerate mass of disunited meat and bone. Although the initial disconnection or disuniting of the components is performed by such apparatus, it remains to separate completely these components so that the bones may be discarded. In the prior art it has become conventional to deal with the problems described above, that is, to isolate the meat from the bones as they are presented in a conglomerate mass by utilizing a brine tank for example. Another technique is what is known as a hydrodynamic technique; also, certain screening methods have been developed for this purpose.

It is a fundamental object therefore of the present invention to efficiently sort out materials of different characteristics from conglomerate masses of these materials.

Another object is to provide a simple technique for the separation of meat from bones when it is required to separate conglomerate masses of these materials.

Another basic object is to reduce both the initial costs and the maintenance costs of such a separation operation.

The present invention in its broadest aspect relates to a method and to apparatus for sorting or separating and recovering the meat from conglomerate masses of disunited meat and bone. This is accomplished by the utilization of what is termed "adhesive-friction." The term "adhesive-friction" is used to refer to a combination of friction, film and associated surface phenomena. In order to obtain the proper adhesive-friction characteristic so as to achieve the desired result of effective separation, it is necessary in some cases to add a fluid as a mechanical catalyst. This aspect will be discussed hereinafter in connection with the several embodiments of the present invention.

In its broadest aspect, then, the present invention is based on the recognition that one can uniquely capitalize on the fact that meat has natural sticky or adhesive properties, and thereby can cause the meat to be affected differently from the bony substances which are to be discarded.

In accordance with more specific features of the present invention, in fulfillment of the previously stated objects, the adhesive-friction principle is embodied in two basic configurations which will be described hereinafter. Common to both of these configurations is the notion of rotating the composite or conglomerate mass of disunited meat and bones so as to impart a predetermined velocity thereto so that, on the one hand, the meat, because of its adhesive properties, will initially cling or adhere to a surface with which it comes in contact. On the other hand, the bones, when rotated in like manner and caused to come into contact with the same surface, will not so cling so that they are readily separated from the meat which has adhered to said surface.

The first embodiment for implementing the principle stated above is a device which consists essentially of a drum rotatable about an axis which is slightly inclined from the horizontal. The disunited carcass members, such as disunited chicken wings or the like, are fed into the higher end of the drum. An adhesive film of natural juices, or a film that is formed by a combination of the natural juices with a catalytic fluid or even water, is such that the meat sticks to the drum and is rotated upwardly until it is caused to fall into a collecting conveyor and then carried by a conveyor belt or the like to the next processing station. Because of the lack of adhesion of the bones, they do not adhere in the aforenoted manner and are discharged at the lower end of the inclined drum.

An alternative embodiment, which is known as an impact configuration, takes the form of a device consisting of a rough disk which is rotated on a vertical axis. The disk functions to throw the composite or conglomerate masses of meat and bone against a shield. The bones bounce from the shield over a separating wall of a funnel-like member. In contrast, their natural adhesive-friction qualities results in absorption of the kinetic energy from the meat particles.

The foregoing and other objects, features and advantages of the invention will be apparent from the following more particular description of preferred embodiments of the invention, as illustrated in the accompanying drawings.

BRIEF DESCRIPTION OF THE DRAWINGS.

FIG. 1 is a perspective view of the first embodiment of the apparatus in accordance with the present invention. This will be denominated the drum embodiment.

FIG. 2 is a longitudinal section view of the apparatus of FIG. 1.

FIG. 3 is a view looking from the feed end of the drum of FIG. 1.

FIG. 8 is a schematic diagram depicting the processing of a food product.

FIG. 9 is a vertical sectional view taken along the line 9—9 in FIG. 8.

FIG. 10 is a fragmentary view illustrating a modification to the drum embodiment.

DESCRIPTION OF PREFERRED EMBODIMENTS

First embodiment

Figure 5:
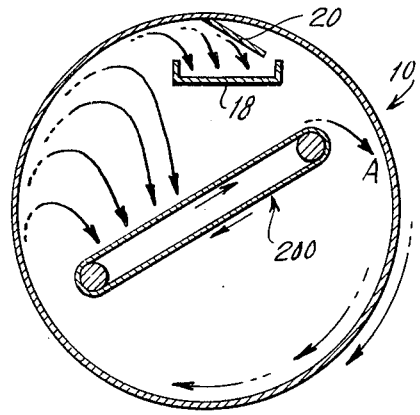
FIG. 5 is a view looking from the feed end of the drum of FIG. 1 and illustrating a modification involving a particle acceleration aid.

Referring now to the moment to FIGS. 1–3, there is illustrated in the several views the first embodiment of the basic apparatus of the present invention. This embodiment is denominated the drum embodiment because the apparatus essentially comprises a drum 10 which is adapted for rotation as indicated by the arrow in FIG. 1. Typical means (not illustrated) are used to produce the required rotation of the drum 10. The drum 10 is carried by a base member 12 and is adapted for rotation on a variable axis by virtue of a frame 14 which is pivotally connected at one end to the base 12. An adjustable bracket at the other end of frame 14 allows for shifting the axis of rotation of the drum 10 from the horizontal. That is to say, the drum 10 is adapted for varying inclination, and, preferably, its delivery end 10a is established below the horizontal while its feed end or input end 10b is established above the horizontal. The drum 10 is guided in its rotational movement by the pairs of rollers 14a and 14b which are engaged, respectively, by the tracks or runners 16a and 16b, shown encircling the drum 10.

Disposed within the drum 10 is a longitudinally extending conveyor pan 18 which is arranged to be driven in a special way for a purpose to be explained. Also situated closely adjacent the inside surface of the drum 10, at the uppermost point in the rotation thereof, is a scraping device 20 which is illustrated as being in two sections for the purpose of adjusting the closeness of the edge of the scraping device to the inside surface of the drum 10. In other words, the portion of the scraper 20 which is shown as being closer to the inside surface can be shifted to maintain yieldable contact with the inside surface. The scraping device 20 is suitably supported by means, not shown, to achieve its function. A pipe 22 extends longitudinally through the drum below the conveyor pan 18 and a typical source of water or fluid is supplied by this pipe 22 to the interior of the drum through suitable nozzles or apertures.

At the lower or delivery end 10a of the drum, the conveyor pan 18 extends over the conveyor belt 24 which is adapted to carry the out-flowing meat to the next processing station.

In the operation of the drum apparatus of FIG. 1, a convenient feed hopper 26, shown in phantom outline in FIG. 2, may be disposed so that a conglomerate mass of disunited poultry meat and bone may be fed into the interior of the drum 10. It will be understood of course that any convenient means may be adapted to feed the disunited material in this manner. As noted before, the apparatus now being described is designed to be employed at the output of the disuniter apparatus described in copending application Ser. No. 603,484. In such arrangement, the disuniter apparatus is preferably mounted on caster wheels and thus can be very easily moved away from the drum 10 in order that both pieces of apparatus may be separately cleaned. Also, with such a portable arrangement, the need for a special conveyor device to transport disunited carcasses from the disuniter apparatus is obviated.

When the composite or conglomerate mass consisting of disunited meat and bone from poultry carcasses is injected into the interior of the drum 10, the meat portions adhere to the drum as they strike the bottom and are carried upward as the drum is rotated to the top of the rotational path. At this point the average particles of meat, that is, those that adhere with average binding force to the inner wall of the drum 10 are pulled away by reason of the force of gravity overcoming the total combined forces of rotational movement and adhesion. However, in the event that some of the particles do not fall by dint of gravity, a scraping device 20 is provided. Thence the meat falls onto the collected tray or pan 18. This operation can be appreciated by referring to the series of arrows 100.

While the aforedescribed effects occur for the meat portions of the composite or conglomerate mass, the bones, since they do not adhere to the drum, tumble away from the inner surface as indicated by the series of arrows 102 and tumble through the drum and are discharged at the lower end into a receptacle 104 located below this delivery end.

It will be manifest to those skilled in the art that the forces of gravity, centrifugal and "adhesive-friction" are the dominant factors which produce the effective separation of meat and bone as described herein. It will be understood then that, in essence, centrifugal force is almost sufficient to counteract gravity to the extent that a particle may be rotated to the top or near enough to be caught by the conveyor pan. With the addition of adhesive force, the total force is great enough. In other words, a meat particle is capable of being moved up to the top of the drum and of contacting the scraper device 20 by reason of the fact that the adhesive force, when combined with the centrifugal force due to the rotation of the drum 10, is sufficient for this purpose. As stated before, those meat particles which are initially retained by slightly smaller adhesive forces will be overcome by the effects of gravity and will be pulled from the drum before they reach or come close to the scraper 20.

It will be appreciated that in the situation of interest here the analysis of the so-called "adhesive-friction" phenomena is a complex matter. It appears from numerous tests that have been conducted that when the drum is rotated slowly, adhesion is the dominant factor in the operation and when the drum is rotated fast, friction dominates. During slow drum rotation all particles stick to the bottom of the drum and when they start their rotation upwardly, the previously described interplay between adhesive force, centrifugal force and gravity is the determining factor in causing the separation. During fast drum rotation the acceleration of meat particles up to the drum speed is not instantaneous and may never occur even for the particles separated onto the conveyor pan 18. The particles separated at the very top of the drum have been accelerated to a sufficient angular velocity to result in enough centrifugal force to get them to the conveyor pan 18 by a force which may be envisioned as sliding friction.

The "adhesive-friction" phenomenon that is so effective for poultry separation, that is, for the separation of conglomerate masses of disunited meat and bone, depends to some extent, in certain cases, on a fluid film that is utilized. This film may consist of any one or a combination of natural juices, fat, water, etc. As noted before, the spray nozzles formed in pipe 22 are used for the purpose of supplying these additional fluids when they are required. When these may be required is, of course, an empirical matter and may be determined by observation.

It has been found desirable, when the separation of the meat has been accomplished, that is, after the meat particles have been caught or intercepted by the conveyor pan 18, to provide reciprocal movement of the pan for most efficient conveying of the meat particles down to the conveyor belt 24. The conveyor pan 18 is driven by an arrangement denoted by the numeral 28, comprising an arm 30 which at its upper end is connected to pan 18 and is mounted to a bracket 32. A spring 34 is attached at one of its ends to the bracket 32 and at its other end to a point on the crank arm 30. The operation is such that when the motor-driven cam 36 acts to drive the lower end of the crank arm 30 the result is that the pan is conveyed in the forward direction; that is, in the direction toward the location of the conveyor 24. This is done at a relatively slow velocity. However, the cam 36 is so configured that it has a steep side and when a certain point in its travel is reached corresponding to the farthest point of travel for the conveyor pan in the forward direction, the pan is thereafter snapped or jerked back because the steep side of the cam is then encountered and the natural bias of the spring comes into play to cause the conveyor pan 18 to move suddenly in the reverse direction.

Figure 4:
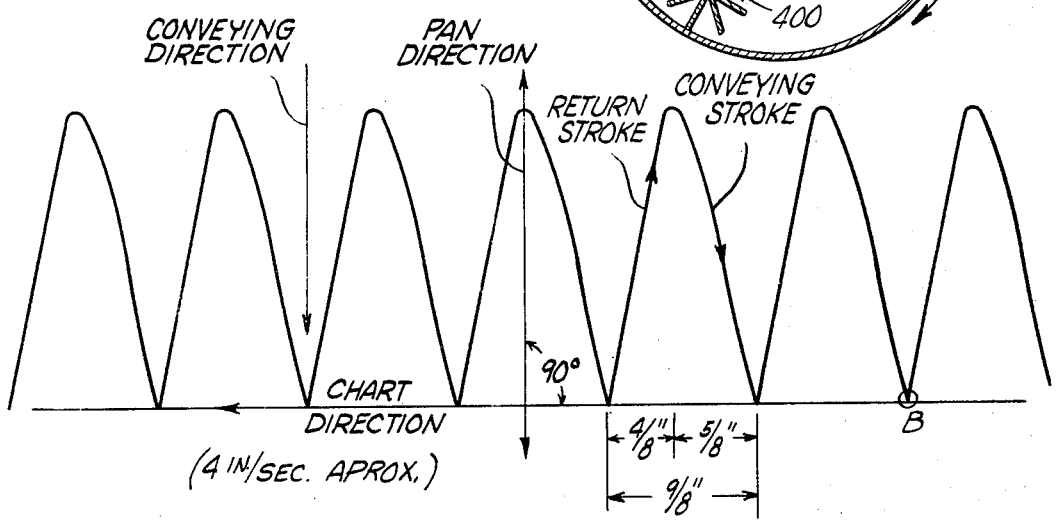
FIG. 4 is a graph depicting the movement of the conveyor pan.

FIG. 4 shows a chart that was made by a prototype pan conveyor. The chart records pan position versus time. The chart in effect demonstrates two methods that are operative in the horizontal conveying due to the movement of the conveyor pan 18 which reciprocates longitudinally, as discussed. One of the phenomena that is operative causes movement of materials with very low coefficients of friction when the pan cycle rate is such that the material is essentially sliding all of the time. Referring to FIG. 4, consider a conveyed particle on the conveyor pan 18; the force resulting from the coefficient of sliding friction accelerates the particle in the conveyed direction five-ninths of the time and in the return direction four-ninths of the time.

The other operative phenomenon involves sticky materials having effective coefficients of friction in the order of 1-10. These materials may stick to the pan during all of the pan cycle, except the part labeled B on the one cycle above. During this period the pan decelerates and accelerates with a force in the order of 10 G's. Thus, the inertia of the conveyed particles supplies a force in the order of 10 G's to break free from static friction and move forward.

Figure 6:
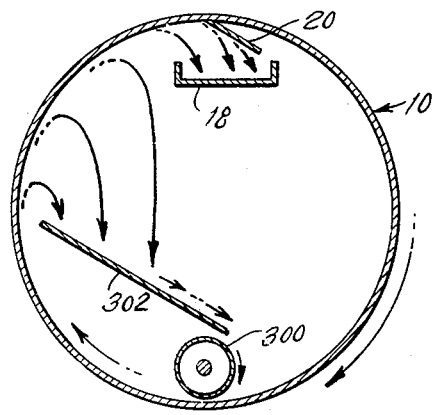
FIG. 6 is the same view as FIG. 3, i.e. looking from the feed end of the drum of FIG. 1, but illustrating a different modification.
Figure 7:
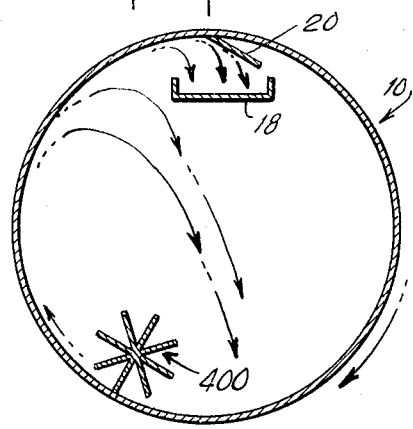
FIG. 7 is the same end view, but illustrating yet another modification.

Referring now to FIGS. 5, 6 and 7, there are illustrated here a number of added modifications which can be incorporated in the basic apparatus already described. Thus, there is shown the addition of what are termed practical acceleration aids. These aids serve a distinct and important function. They continuously start the meat particles that are to be separated on potential separation revolutions with constant velocities from a constant angular position. Thus, these acceleration aids have two distinct advantages: They permit the separation of particles which differ only very slightly in "adhesive-friction" characteristics and further, they permit the separation of particles which produce very slight force stemming from the "adhesive-friction" characteristics from similar particles which differ from the first-named particles in that they have slightly lower "adhesive-friction" characteristics.

Referring specifically to FIG. 5, the acceleration aid illustrated therein consists of a vibrating or belt conveyor 200 which transfers all of the particles to be separated, including the initially fed particles, to an elevated point inside the drum 10 (shown at point A in FIG. 5), such that gravity will impart a radial velocity relative to the drum 10 in the direction of drum travel (which is shown as clockwise). In this modification, the feeding arrangement (not shown) is such that all of the meat particles are conveyed directly onto the top run of the conveyor 200 whereby, as already indicated, these particles will be started on potential separation revolutions with constant velocities from a constant angular position. Accordingly, due to the initial velocity which is imparted to the particles, most of them will reach the conveyor, as indicated by the series of arrows at the top of the drum 10. However, due to the slightly different characteristics of various particles, some of them will not reach the conveyor pan 18 but will move away from the rising side of the drum as indicated by the other arrows and will fall upon the moving conveyor 200, whence they will be recycled and given another opportunity to reach the conveyor pan 18.

It should be noted that by reversing the direction of the accelerating aid in FIG. 5, that is, by reversing the direction of the conveyor belt 200, particles with large "adhesive-friction" characteristics will not reach the separating conveyor 18 when the opposite would happen if they were fed at the bottom of the drum; thus, particles with slightly larger "adhesive-friction" forces can be separated from those with the original characteristics mentioned above.

Other versions of the acceleration aids for the particles to be separated are illustrated in FIG. 6 and 7. The accelerating aid in FIG. 6 takes the form of a pliable faced cylinder 300 which operates in combination with a baffle 302 so as to cause all of those particles which are starting a separating revolution, to pass between it and the inner surface of the drum 10, and thus to acquire drum velocity which will permit separation to occur in a similar manner to the separation previously described in connection with the accelerating aid shown in FIG. 5.

In FIG. 7 the accelerating aid is in the form of a cylindrical paddle wheel 400 which imparts a control velocity to those particles passing between the periphery of the paddles and the drum 10. Again, the separation process is as previously described.

Referring to FIG. 8, there will be appreciated by reference thereto the way in which the separating apparatus of the present invention fits into the overall scheme of things, that is, in the complete processing operation consisting of the basic steps of disuniting the meat from the bone of a poultry carcass, separating the conglomerate mass of meat and bone, and thence further processing of the separated meat so as to insure that tiny bones have been removed. The disuniter apparatus designated 500 includes an output chute or shield 510. After the disuniting operation has been performed, the conglomerate mass of meat and bone is sent down the chute 510 and into the previously-described drum separator 10. The meat which has been separated by virtue of the function of the drum 10 is conveyed from the conveyor pan 18 onto the traveling conveyor belt 24 and thence is moved as indicated by the arrows down to the inspection station, at which station there is provided a tent-like arrangement 550 for the inspection of the meat products. Within the tent or booth 550 inspectors are able to detect the presence of tiny bones remaining in the food product by the use of an ultra-violet device 552. Any bones present in the final product will fluoresce under the ultra-violet light produced by the device 552 and such bones can then be picked out and discarded in suitable receptacles. The product thus inspected will pass on to the container 560.

FIG. 10 illustrates a modification of the drum separator 10 of the present invention. This particular modification is provided for overcoming a problem in the separating operation. The problem occurs because the disuniter 500 in some instances has a discharge such that some of the particles begin the initial separation rotation with a positive angular velocity component while other particles enter with a negative velocity. In order to overcome this difficulty so that the separating efficiency will not be impaired an additional scraping device 580 is disposed immediately adjacent the feed end of the drum 10. The scraper device 580, which can, if preferred, be extended into the disuniter assembly, acts to stop all those particles just entering the drum and to cause them to fall back and work down the longitudinal axis until they are completely clear of the feed area. In other words, they are sufficiently far from the discharge of the disuniting apparatus. Then they are free to start their separating rotation.

In order to furnish a man skilled in the art with some of the operating details it should be noted that the drum 10 is, as one example, constructed to be 30 inches in diameter by 48 inches long and the separating drum is rotated for efficient separation at approximately 16 r.p.m. It was found in tests that were performed with the separating drum 10 that the percent meat yield that could be obtained was 37.4%.

ALTERNATIVE EMBODIMENT (FIGURES 11 AND 12)

Figure 11:
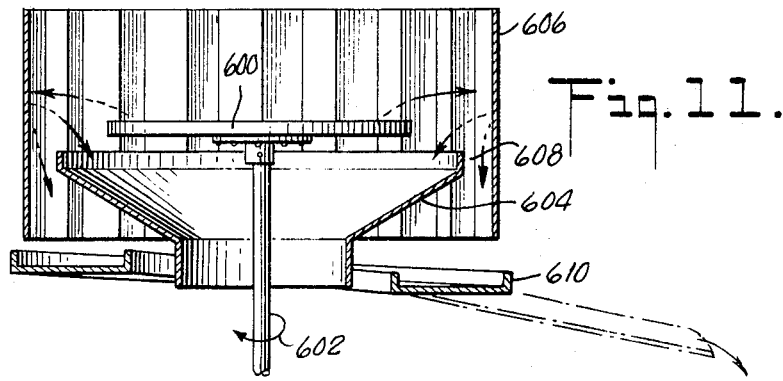
FIG. 11 is a vertical sectional view of the alternative or disk embodiment for the apparatus of the present invention.
Figure 12:
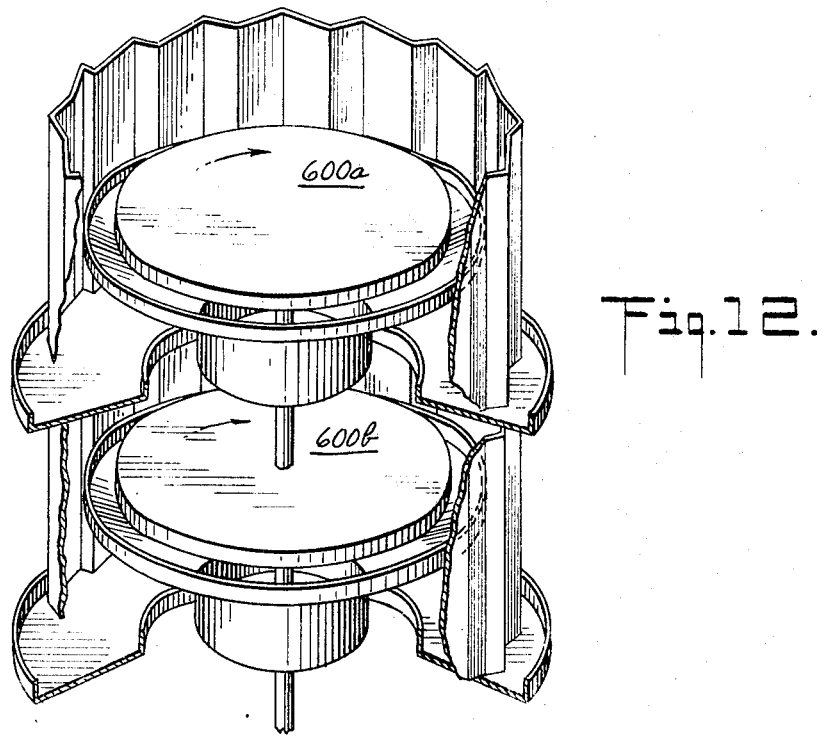
FIG. 12 is a perspective view, partly broken away, illustrating a modification of the disk embodiment of FIG. 11.

An alternative embodiment that implements in a different way the basic principles of the present invention is illustrated in FIGS. 11 and 12. This embodiment is conveniently denominated an impact or disk embodiment. As was the case before with the first embodiment or drum configuration, the fundamental principle of operation resides in the notion of exploiting the difference in the adhesive properties between meat and bone in the conglomerate mass of such materials; more particularly, in uniquely combining several forces including the adhesive force, whereby the forces act upon the conglomerate mass so as to separate the meat from the bone.

The apparatus illustrated in FIGS. 11 and 12 comprises a disk 600 which is suitably journaled for rotation on a vertical axis as indicated by the arrow 602. Concentric with the disk 600 and spaced below it is a funnel 604 whose top is opened and is immediately disposed below the disk 600. Beyond the periphery of both the disk 600 and the top of the funnel 604 is a surrounding shield or barrier 606.

The operation of this form of the apparatus is such that the disk 600 rotating on its vertical axis acts to throw the composite or conglomerate mass outwardly from the center of the disk. Of course as discussed already, suitable provision is made so that the conglomerate mass can be introduced into the apparatus such that it will fall onto the central portion of the disk 600. As the conglomerate mass is thrown outwardly, the meat and bone are thrown against the barrier 606. The bones rebound from the barrier, that is they bounce over the upper edge of the funnel 604 and travel down through the funnel to a suitable exit point. In contrast to the action of the bones, the meat upon striking the barrier 606 tends to cling thereto at least momentarily. This is because of the nature of the meat particles whose kinetic energy is absorbed. The meat particles thereafter due to the action of gravity fall into the space 608 between the barrier 606 and the top portion of the funnel 604. This space defined by the shield and the funnel constitutes a passageway or means for delivering the meat, now separated from the bone, to a chute 610 for conveyance to a suitable collecting point.

In some cases, as was also true with the drum embodiment of FIG. 1, it becomes necessary to provide reciprocating motion for the barrier 606 in order to cause the adhered meat to slide down and move into the space 608 alhough in most cases the force of gravity is sufficient to cause the meat to drop down.

FIG. 2 illustrates a modification to the alternative or disk embodiment of FIG. 11; that is it illustrates a configuration consisting of a plurality of separating disks 600a and 600b spaced from each other on a common vertical axis, rather than a single disk. With this configuration the notion is simply to provide a second chance for the meat that has not fallen down properly to ts collecting point. In other words, to have the same essential forces reapplied at the lower disk, that is, disk 600b, to perform again the same operation as obtained with the upper disk 600a.

It will be appreciated that what has been disclosed herein is a method and apparatus for uniquely exploiting the difference in the adhesive characteristics, particularly, of meat and bone so that in conglomerate masses of these materials the two may be efficiently separated.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A process for separating meat from a conglomerate mass of disunited meat and bones comprising the steps of:
    feeding a conglomerate mass of disunited meat and bones to a rotatable device which is bounded circumferentially by an inner surface constituting a barrier;
    rotating said device to impart to the conglomerate mass a predetermined velocity such that the meat, because of its inherent adhesive properties, initially clings to said inner surface wth sufficient binding force to be conveyed upwardly by said surface, and thereafter, due to gravity, moves from said inner surface to a conveyor;
    separately conveying the meat as it is received from said inner surface, and discharging the bones from said device.

2. A process as defined in claim 1, in which the step of separately conveying the meat includes conveying by a conveyor pan extending longitudinally in a direction parallel with the axis of said rotatable device.

3. A process as defined in claim 2, further including the step of reciprocally moving said conveyor pan on its longitudinal axis.

4. A process as defined in claim 3, further including the step of producing different velocities in the forward and reverse directions for said conveyor pan.

5. A process as defined in claim 2, further including the step of conveying the meat by a conveyor belt as the meat moves from one end of said conveyor pan.

6. A process as defined in claim 5, further including the step of assisting in the removal of the meat from the inner surface of said rotatable device by a scraper device.

7. A process as defined in claim 6, further including the step of spraying the interior of the rotatable device with fluid.

References Cited

UNITED STATES PATENTS

| | | |
|---|---|---|
| 1,458,467 | 6/1923 | Dolbear. |
| 1,627,648 | 5/1927 | Johnson. |
| 3,042,208 | 7/1962 | Holmes. |
| 3,173,795 | 3/1965 | Torr. |

FRANK W. LUTTER, Primary Examiner

U.S. Cl. X.R.

17—1; 146—222; 204—119; 209—45, 452